United States Patent [19]
Yamazaki et al.

[11] Patent Number: 5,606,384
[45] Date of Patent: Feb. 25, 1997

[54] LENS BARREL HAVING AN IMAGE BLUR PREVENTION SYSTEM ARRANGED WITH RESPECT TO OTHER LENS BARREL DEVICES TO EFFICIENTLY UTILIZE LENS BARREL SPACE

[75] Inventors: Satoshi Yamazaki, Tokyo; Akira Katayama, Koganei; Hiroshi Okano, Tokyo, all of Japan

[73] Assignee: Nikon Corporation, Tokyo, Japan

[21] Appl. No.: 377,585

[22] Filed: Jan. 24, 1995

[30] Foreign Application Priority Data

Jan. 24, 1994 [JP] Japan .................................. 6-21885

[51] Int. Cl.⁶ .................................................. G03B 17/00
[52] U.S. Cl. ................................................ 396/55; 359/557
[58] Field of Search ................................. 354/195.1, 202, 354/400, 402, 403, 430; 348/208; 359/554, 557, 822, 823

[56] References Cited

U.S. PATENT DOCUMENTS 5,335,032  8/1994  Onuki et al. .......................... 354/195.1
5,416,558  5/1995  Katayama et al. ................... 354/430 X Primary Examiner—Howard B. Blankenship

[57] ABSTRACT

A lens barrel having an image blur prevention system including an image blur prevention optical system to prevent image blur, and an image blur prevention optical system drive mechanism to move the image blur prevention optical system within a plane that is generally perpendicular to the optical axis of a main optical system. The image blur prevention optical system drive mechanism is arranged around the image blur prevention optical system to most efficiently use the space in the lens barrel. A power transfer shaft, which is connected to a focusing system in the lens barrel, is arranged in parallel to the image blur prevention optical system, and the focusing system is located in front of the image blur prevention optical system so that it does not interfere with the image blur prevention optical system drive mechanism arranged around the image blur prevention optical system. By efficiently using the space in the lens barrel, the assembly and disassembly of the lens barrel is simplified. Further, by preserving space for the image blur prevention optical system, a large lens size may be maintained.

14 Claims, 2 Drawing Sheets

LENS BARREL HAVING AN IMAGE BLUR PREVENTION SYSTEM ARRANGED WITH RESPECT TO OTHER LENS BARREL DEVICES TO EFFICIENTLY UTILIZE LENS BARREL SPACE

BACKGROUND OF THE INVENTION

1. Field of the Invention

The present invention relates to an interchangeable lens barrel having an image blur prevention system incorporated therein, and, more particularly, to an interchangeable lens barrel including an image blur prevention system having an image blur detection device to detect vibration, an image blur prevention optical system, and an image blur prevention optical system drive mechanism, which are arranged with respect to other lens barrel components in a manner which efficiently utilizes the space within the lens barrel.

2. Description of the Related Art

Interchangeable lens barrels are known which may be easily attached to and removed from a camera, such as a single-lens reflex camera. The known types of interchangeable lens barrels may include, for example, a zooming mechanism to adjust the focusing distance of a lens optical system from telephoto to wide-angle, and an autofocus (AF) mechanism to automatically perform subject focusing. Recently, image blur prevention systems have also been incorporated into lens barrels to compensate for camera vibration caused by, e.g., a photographer's hand movement, resulting in multiple functions incorporated into the lens barrel.

The types of lens barrels described above, having the image blur prevention system and the various other mechanisms, include a multiple lens optical system, multiple drives (including electric motors), control circuits, and sensors for sensing information related to the various mechanisms. The size of the lens barrel is determined by the diameter of the optical lens system contained inside the lens barrel. Since it is not desirable for the lens barrel to be made any larger than is necessary, the space inside the lens barrel must be used as effectively as possible. Therefore, the multiple drives, the control circuits, and the sensors must be arranged efficiently in the lens barrel.

However, the following problems occur in the known types of lens barrels which include an image blur prevention system. Specifically, the image blur prevention optical system is arranged to move within the lens barrel in a plane perpendicular to an optical axis I of a photographic optical system in the lens barrel. Accordingly, space must be preserved around the image blur prevention optical system so that the image blur prevention optical system can move. Recently, the drive motor that drives the image blur prevention optical system and the drive mechanics, such as a power transfer drive gear, have increased in size and complexity, requiring increased space for arranging these elements, and resulting in increased difficulty of assembly and disassembly due to the complexity. When the drive mechanics are arranged around the image blur prevention optical system, because of the space taken up by the drive mechanics the diameter of the optical system must be reduced.

Further, in general, the image blur prevention optical system drives are arranged with fixed parts connected to a fixed barrel, or with fixed parts connected to a fixed barrel portion that is connected to the lens barrel. With these kinds of lens barrels, it is desirable to reduce the lens barrel diameter as much as possible. However, when the diameter of the lens of an image blur prevention optical system is reduced, the amount of freedom for aberration adjustments is reduced and the blur adjustment tolerance also is reduced. Therefore, it is desirable to make the diameter of the image blur prevention lens as large as possible. To make the diameter of the image blur prevention lens as large as possible, the image blur prevention optical system drive must use the previously unused space within the lens barrel as efficiently as possible.

Furthermore, a focusing device, such as the AF mechanism, generally uses the drive power from the main body of the camera. Therefore, it is necessary to arrange the power transfer drive system for transferring power from the main body to the focusing device in a manner which efficiently utilizes the space inside the lens barrel.

SUMMARY OF THE INVENTION

Accordingly, it is an object of the present invention to provide a lens barrel including multiple devices arranged inside the lens barrel.

It is another object of the present invention to provide a lens barrel having multiple devices arranged inside the lens barrel in a manner which efficiently uses the space inside the lens barrel.

It is a further object of the present invention to provide a lens barrel having multiple devices arranged inside the lens barrel in a manner which simplifies the assembly and disassembly of the lens barrel.

It is yet another object of the present invention to provide a lens barrel including an image blur prevention optical system and other devices arranged inside the lens barrel, wherein the devices other than the image blur prevention optical system are efficiently arranged such that space is preserved for the image blur prevention optical system.

It is yet another object of the present invention to provide a lens barrel having an image blur prevention optical system including an image blur prevention lens arranged in the lens barrel and multiple devices arranged inside the lens barrel in a manner such that the maximum diameter of the image blur prevention lens may be achieved, and an increase in the amount of freedom for aberration adjustment of the image blur prevention lens and blur adjustment tolerance results.

Additional objects and advantages of the invention will be set forth, in part, in the description which follows, and, in part, will be obvious from the description or may be learned by practice of the invention.

Objects and advantages of the present invention are achieved by providing an interchangeable lens barrel, suitable for use in a single-lens reflex camera, having an image blur prevention system including an image blur prevention optical system which is moved in a plane perpendicular to the optical axis of a main optical system to prevent image blur. An image blur prevention optical system drive mechanism drives the image blur prevention optical system and is arranged in a space surrounding the image blur prevention optical system, without physically interfering with other functions incorporated in the lens barrel. The components which comprise the image blur prevention optical system drive mechanism are arranged around the image blur prevention optical system in parallel to the optical axis.

Objects and advantages of the present invention are also achieved with an interchangeable lens barrel, suitable for use in a single-lens reflex camera, comprising an image blur prevention system including an image blur prevention optical system which is moved in a plane perpendicular to the optical axis of a main optical system to prevent image blur, an image blur prevention drive mechanism to move the image blur prevention optical system in a plane perpendicular to the optical axis, a focusing system arranged in front of the image blur prevention drive mechanism to focus the main optical system, and a power transfer drive shaft that transfers drive power from the camera's main body to the focusing system for performing focusing. The power transfer drive shaft is arranged in a location that is near the image blur prevention optical system and does not interfere with the image blur prevention optical system drive.

In accordance with the preferred embodiments of the present invention, the image blur prevention optical system is arranged in a specific location inside the lens barrel, and the image blur prevention optical system drive is arranged at an appropriate location around the image blur prevention optical system so that the image blur prevention optical system drive mechanism does not interfere with the movement of the image blur prevention optical system. Further, other devices, such as the power transfer drive shaft for the focusing system, are arranged at a location inside the lens barrel where they do not interfere with the image blur prevention optical system.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
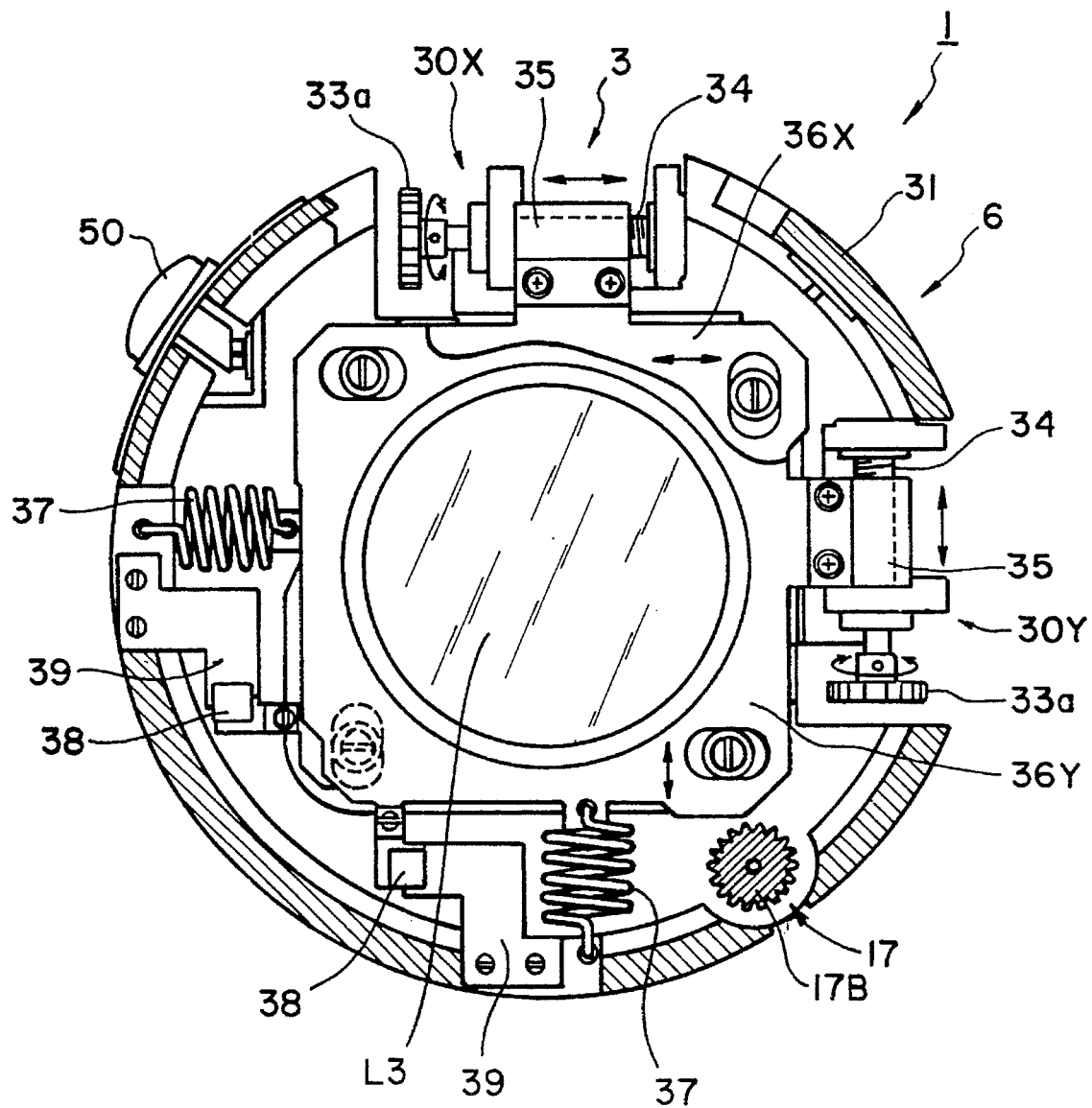
FIG. 1 is a cross-sectional view across the width of a lens barrel in accordance with an embodiment of the present invention.

Reference will now be made in detail to preferred embodiments of the present invention, examples of which are illustrated in the accompanying drawings wherein like reference numerals refer to like elements throughout.

Figure 2:
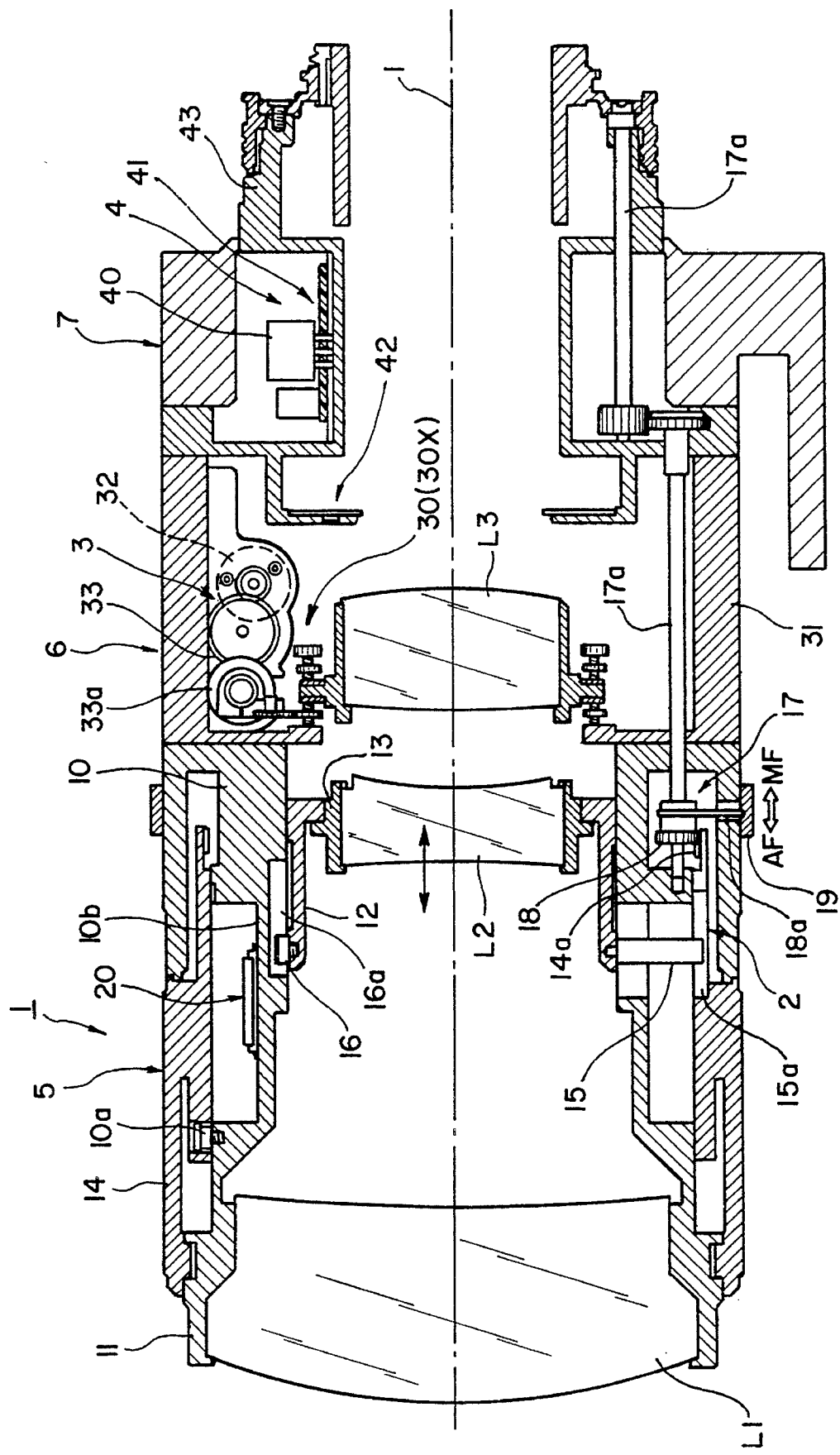
FIG. 2 is a cross-sectional view across the length of the lens barrel in accordance with an embodiment of the present invention.

FIGS. 1 and 2 are cross-sectional views of a lens barrel taken across a width and a length, respectively, of the lens barrel in accordance with a preferred embodiment of the present invention. The lens barrel 1 shown in FIGS. 1 and 2 is an interchangeable lens barrel which fits onto a single-lens reflex camera (not shown) and can be freely attached to and removed from the single-lens reflex camera.

As shown in FIG. 2, the lens barrel 1 includes a focusing system 2 to conduct manual focus (MF) or auto-focus (AF) of a main optical system, an image blur prevention system 3 to prevent image blur which occurs due to camera vibration generated, e.g., by a photographer's hand movement, and a vibration detection sensor assembly 4 to detect whether vibration is occurring to an extent causing image blur.

The lens barrel 1 comprises a lens barrel front assembly 5 which contains the focusing system 2, a lens barrel center assembly 6 which contains the image blur prevention system 3, and a lens barrel rear assembly 7 which contains the vibration detection sensor assembly 4. The several components that comprise the focusing system 2 are assembled inside an inner circumferential portion of the lens barrel front assembly 5 near the lens barrel center assembly 6. The lens barrel rear assembly 7 fits onto the main body of the camera such that the lens barrel 1 can be easily attached to and removed from the camera, and also includes a focusing device 42 is installed at the front end of the inside portion of the lens barrel rear assembly 7. Further, the vibration detection sensor assembly in the lens barrel rear assembly 7 includes a sensor unit 41 having a substrate with an image blur detection sensor 40 mounted thereon. The lens barrel rear assembly 7 has a fixed barrel section 43 which is connected in series with a fixed barrel section 31 of the lens barrel center assembly 6 and a fixed barrel section 10 of the lens barrel front assembly 5 to form the lens barrel 1. The respective sections 10, 31 and 43 are connected together with screws, The lens barrel 1 also includes a first group of lenses L1, a second group of lenses L2 and a third group of lenses L3, which together comprise a photographic optical lens system. The first group of lenses L1 are fixed lenses which are positioned at the front-end section of the lens barrel 1; the second group of lenses L2 are focusing lenses which are supported inside the lens barrel 1 such that they can move forward and backward in the direction of the optical axis I to perform focusing; and the third group of lenses L3 are an image blur prevention lens group which is moved in the X-axis and Y-axis directions in a plane perpendicular to the optical axis I to prevent image blur of a subject image on an image-forming plane (e.g., a film surface) generated by camera vibration. The third group of lenses L3 is driven by an image blur prevention drive mechanism 30 which is also included in the lens barrel center assembly 6.

In the lens barrel front assembly 5, the first group of lenses L1 is held and supported by a lens retainer frame 11 at the front end of the fixed barrel 10. An outer circumference of a movable barrel 12 is arranged and supported inside the fixed barrel 10 such that it can move freely forward and backward in a direction along the optical axis I. A lens frame 13, which supports the second group of lenses L2, is arranged at the rear end of the movable barrel 12. A rotating barrel 14 is provided at the outer circumference of the front end of the fixed barrel 10. The rotating barrel 14 is a manual focus (MF) ring which allows MF operations to be conducted by rotating the rotating barrel 14 through manual operation when in the MF mode. As will be described in more detail later, during the auto-focus (AF) mode, the rotating barrel 14 is also rotated along with the rotation of an AF drive source. The rotating barrel 14 moves the second group of lenses L2 forward and backward in the direction of the optical axis I when the rotating barrel 14 is rotated. Specifically, since lens frame 13 is connected to the movable barrel 12 and supports the second group of lenses L2, when the rotating barrel 14 rotates, movable barrel 12 moves in the direction of the optical axis, and the second group of lenses L2 is moved for focusing. The rotating barrel 14 is designed such that it can freely rotate with the condition that its motion in the direction of the optical axis I is limited by an insert pin 10a of fixed barrel 10 which moves in a ring-shaped guide.

Interlinking pins 15 and 16 are inserted on the outside circumference of the movable barrel 12 and connect the rotating barrel 14 with movable barrel 12. Interlinking pin 15 protrudes in a radial direction through a gap in the fixed barrel 10. The interlinking pin 15 also enters a spiral-shaped guide gutter 15a which is formed in the rotating barrel 14. Interlinking pin 16 enters a straight key guide gutter 16a that is formed on an inside circumference of the fixed barrel 10.

The focusing action during the AF mode will now be described below. A segment gear 14a is arranged inside the rear circumference of the rotating barrel 14 and meshes with a transfer gear 18 which can freely move in the direction of the optical axis I by hooking a spline to a power transfer shaft 17, comprising transfer shafts 17a and 17b. The power transfer shaft 17 receives rotating power transferred from the camera main body through transfer shafts 17a and 17b. The transfer gear 18 is interlinked to the segment gear 14a in the direction of rotation of the transfer shaft 17b. It is noted that transfer shafts 17b and 17a are arranged in the lens barrel center and rear assemblies 6 and 7, respectively, and are appropriately bridged and supported. In accordance with the above-described structure of the focusing system 2, the power transfer shaft 17 serves as an AF drive source when it rotates, causing the transfer gear 18 to rotate which in turn rotates the rotating barrel 14 via segment gear 14a that is meshed with transfer gear 18. As a result, AF action is produced via movement of the movable barrel 12 when the rotating barrel 14 rotates.

An MF/AF switching ring 19 is arranged on the outside circumference of fixed barrel 10 such that it can slide in a direction of the optical axis I. The switching ring 19 allows switching between an AF mode and an MF mode. A switching lever 18a extends from a portion of transfer gear 18 and is connected to the switching ring 19. The transfer gear 18 is supported so that it can move in a direction of the axle of transfer shaft 17b of the power transfer shaft 17. Because the transfer gear 18 can move, the AF drive source (i.e., power transfer shaft 17) may be separated from the rotating barrel 14 by manually switching the switching ring 19 to the MF side, thereby moving transfer gear 18 on transfer shaft 17b in a direction of the axle of transfer shaft 17b and unmeshing transfer gear 18 from segment gear 14a. In this state, when the rotating barrel 14 is manually rotated, it is possible to conduct manual focusing with the second group of lenses L2.

A small groove 10b is formed in fixed barrel 10 with a notch that contains a circuit unit 20 comprising a flexible printed circuit substrate (FPC substrate) on which various electrical components, such as a CPU (not shown), are mounted. The circuit unit 20 may be appropriately arranged over a portion of the small groove 10b or over the entire circumference of the groove 10b. A portion of the FPC substrate of the circuit unit 20 is extended to the side of the lens barrel center assembly 6 inside the lens barrel 1. The edge of the circuit unit 20 connects with another FPC substrate (not shown), and is connected to the image blur prevention system 3 contained in the lens barrel center assembly 6, and to the vibration detection sensor assembly 4 contained inside the lens barrel rear assembly 7. In each of the lens barrel front assembly 5, the lens barrel center assembly 6 and the lens barrel rear assembly 7, wiring devices of each FPC substrate connect electrical circuits, such as control units, on the FPC substrates. These electrical circuits are connected linearly at a location (not shown) on the outside circumference of the lens barrel center assembly 6 to the FPC substrate in the lens barrel front assembly 5.

In accordance with the preferred embodiment of the present invention, each of the lens barrel front, center and rear assembly 5, 6 and 7, respectively, are individual units that have devices assembled inside of them, and the units are later connected together. Since the lens barrel 1 is separated into three units, front, center and rear 5, 6 and 7, respectively, each of the front, center and rear units 5, 6 and 7 can be assembled and adjusted individually, and, therefore, the ease of assembly is improved. The lens barrel 1 may be assembled later by combining the units 5, 6 and 7 together. Thus, the lens barrel assembled in the above-described manner is superior in terms of adjustability, ease of connection and ease of assembly. Further, a more uniform product is produced and it is possible to reduce costs.

Another important feature of the preferred embodiment of the present invention resides in arranging the image blur prevention optical system drive mechanism 30 at a location that does not interfere with other devices around the image blur prevention optical system L3.

As seen in FIG. 1, the image blur prevention optical system drive mechanism 30 comprises a drive for the X-axis 30X, and a drive for the Y-axis 30Y. These drives 30X and 30Y are provided at locations which are at a 90 degree angle with respect to each other around the image blur prevention optical system L3. Image blur prevention optical system L3 can be shifted in any direction by the drives 30X and 30Y which move the image blur prevention optical system in the X-axis direction and in the Y-axis direction, respectively, to prevent image blur caused by, e.g., hand movement.

Electrical motors 32 (FIG. 2, only one is shown) are the driving source for the image blur prevention optical system drive mechanism 30. Transfer gears 33 transfer the rotation of the motors 32 to feed screws 34 that are built into the last gears 33a of transfer gear 33. Feed nuts 35, which mesh with the feed screws 34, are mounted on moving plates 36X and 36Y, and transfer the motion of the feed screws 34 in the direction of the X-axis and Y-axis, respectively, to move the image blur prevention optical system L3.

The supporting frame for the image blur prevention optical system L3 moves in the appropriate X- or Y-axis direction when each plate 36X and 36Y shifts via the image blur prevention drive mechanism 30 converting rotary movement to linear movement. Further, each plate 36X and 36Y and the lens support frame are connected via a guide device and can only move in the appropriate direction. Springs 37 act on the plates 36X and 36Y to move them in the desired direction.

Photo-interrupters 38 are attached to each plate 36X and 36Y for detecting the direction and amount of movement of the image blur prevention optical system L3. Printed substrates 39 are also installed in the fixed barrel portion 31.

As seen in FIG. 1, an image blur prevention activation button 50 is arranged on the outside circumference of fixed barrel portion 31 for selecting, with manual operation, whether image blur prevention is performed. The image blur prevention activation button 50 is installed in the lens barrel center assembly 6 and is located around the image blur prevention optical system L3 at a location which does not interfere with the image blur prevention optical system drive devices 30X and 30Y.

Furthermore, as shown in FIG. 1, in the lens barrel 1 in accordance with the preferred embodiment of the present invention, drive transfer shaft 17 (17b) transfers the driving power from the camera main body to focusing system 2. Focusing system 2, which focuses the photographic optical system, is arranged at the front of the image blur prevention optical system L3. Drive transfer shaft 17 is arranged at a position near the image blur prevention optical system L3 so that it does not interfere with the drives 30X and 30Y, and is shifted approximately 45 degrees from the X and Y axes.

With the above-described structure, the image blur prevention optical system L3 is installed inside the lens barrel 1 in a location where it can be shifted and the image blur prevention drive mechanism 30 (30X and 30Y) is also appropriately arranged around the image blur prevention optical system L3 so that it is in a location where it does not interfere with the shifting action.

In the above-described manner, drive transfer shaft 17 of focusing system 2 is arranged inside the lens barrel 1 with respect to the image blur prevention system 3 in a manner that it does not interfere with other lens barrel mechanisms. Therefore, the lens barrel is superior in terms of its use of space and arrangement of devices.

It will be recognized that embodiments of the present invention are not limited to the structure described above and various modifications are possible. For example, the shape or structure of the mechanisms inside the lens barrel 1 can be appropriately changed. For example, in the embodiments described above, the image blur prevention drive feed screw is arranged in a direction in which the image blur prevention optical system L3 is shifted; however, the present invention is not limited to this arrangement, and it is possible to have the feed screw arranged perpendicular to the direction of the shifting. Further, the devices that are arranged around the image blur prevention optical system L3 are not limited to the above-described shaft 17 that runs to the focusing system 2, and various other devices can be also be situated around the optical system L3. Furthermore, in the embodiments described above, the lens barrel 1 was preferably attached to a single-lens reflex camera. However, the present invention is not limited to use with a single lens reflex camera, and can be effectively used with lens barrels having image blur prevention devices in a variety of cameras.

As described above, the lens barrel in accordance with the preferred embodiments of the present invention includes an image blur prevention optical system that prevents image blur when it is moved in a plane generally perpendicular to the optical axis of a main optical system, and an image blur prevention optical system drive mechanism that drives the image blur prevention optical system. The image blur prevention optical system drive mechanism is arranged around the image blur prevention optical system in a location such that it does not interfere with other devices. Therefore, with a simple arrangement, the image blur prevention optical system keeps its shifting range free so that the problem of interference with other devices is eliminated.

In addition, in accordance with the preferred embodiments of the present invention, because the image blur prevention optical system drive mechanisms are arranged effectively using the space around the image blur prevention optical system, the lens size in the image blur prevention optical system can be made relatively large. Therefore, the amount of peripheral light entering the lens is larger so that it is brighter for a given f-number. Accordingly, the amount of freedom to adjust for aberration increases and the blur-adjustment capability can be increased.

Furthermore, in accordance with the lens barrel of the preferred embodiments of the present invention, the power transfer shaft that transfers the drive power from the camera main body to the focusing system is arranged in front of the image blur prevention optical system and the image blur prevention drive mechanism is arranged around the image blur prevention optical system in a location that does not interfere with other devices. Therefore, various devices may be installed inside the lens barrel because the devices are efficiently arranged. Further, the assembly and disassembly of the lens barrel can be simplified, the number of operation stages to produce the lens barrel can be reduced, and repairs can be easily performed.

The above-described advantages also apply when arranging other devices, such as an image blur prevention activation button and an image blur prevention shift amount detector in the unused space around the image blur prevention optical system.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. A lens barrel, comprising:

an image blur prevention optical system to prevent image blur, the image blur prevention optical system having an optical axis;

an image blur prevention optical system drive mechanism to drive the image blur prevention optical system, the image blur prevention optical system drive mechanism being arranged around a circumference of the image blur prevention optical system;

a power transfer shaft arranged adjacent the image blur prevention optical system, wherein the image blur prevention optical system drive mechanism is positioned at approximately an x-axis and a y-axis with respect to the optical axis, and the power transfer shaft is positioned at approximately a 45° angle with respect to the x and y axes, such that the image blur prevention optical system is driven without interference from the image blur prevention optical system drive and power transfer shaft.

2. A lens barrel as recited in claim 1, further comprising:

a main optical system having an optical axis; and a focusing system positioned in front of the image blur prevention optical system to focus the main optical system, wherein the power transfer shaft drives the focusing system.

3. A lens barrel as recited in claim 2, wherein the power transfer shaft is parallel to the optical axis.

4. A lens barrel as recited in claim 1, wherein the lens barrel further comprises an image blur prevention activation button to activate an image blur prevention operation.

5. A lens barrel, comprising:

a main optical system having an optical axis;

an image blur prevention optical system;

an image blur prevention optical system drive mechanism to move the image blur prevention optical system in a plane generally perpendicular to the optical axis of the main optical system to prevent image blur, the image blur prevention optical system drive mechanism including a first drive mechanism and a second drive mechanism arranged surrounding the image blur prevention optical system to move the image blur prevention optical system in an x-axis direction and a y-axis direction, respectively, the first and second drive mechanisms being located at a 90° angle from each other with respect to the optical axis;

a focusing system to focus the main optical system, the focusing system being located in front of the image blur prevention optical system; and a power transfer shaft to transfer power to the focusing system to focus the main optical system, the power transfer shaft being arranged in parallel to the optical axis and at a 45° angle with respect to the x and y axes.

6. A lens barrel as recited in claim 5, wherein the power transfer shaft transfers power to the focusing system when the lens barrel is in an auto-focus mode.

7. A lens barrel, comprising:

a lens barrel front assembly including a focusing system;

a lens barrel center assembly including an image blur prevention system; and a lens barrel rear assembly including a vibration detection sensor assembly, wherein each of the lens barrel front, center and rear assembly are separate units which are connectable together.

8. A lens barrel as recited in claim 7, wherein the lens barrel center assembly further includes a transfer shaft to drive the focusing system, and the image blur prevention system includes an image blur prevention optical system and an image blur prevention optical system drive mechanism to drive the image blur prevention optical system.

9. A lens barrel as recited in claim 8, wherein the transfer shaft is parallel to an optical axis of the lens barrel.

10. A lens barrel as recited in claim 9, wherein the image blur prevention optical system drive mechanism includes first and second drive mechanisms to drive the image blur prevention optical system in an x-axis direction and a y-axis direction, respectively, the first and second drive mechanisms being positioned at a 90° angle from each other with respect to the optical axis, and the transfer shaft is positioned at a 45° angle with respect to the x and y axes.

11. A lens barrel as recited in claim 7, wherein the lens barrel center assembly further comprises an image blur prevention activation button to activate an image blur prevention operation.

12. A lens barrel, comprising:

an image blur prevention optical system to prevent image blur;

an image blur prevention optical system drive mechanism to drive the image blur prevention optical system in an x-axis direction and in a y-axis direction, the image blur prevention optical system drive mechanism being arranged around a circumference of the image blur prevention optical system; and a power transfer shaft arranged adjacent the image blur prevention optical system at a 45° angle with respect to the x and y axes, wherein the image blur prevention optical system drive mechanism drives the image blur prevention optical system such that the image blur prevention optical system may be driven without interference from the image blur prevention optical system drive and the power transfer shaft.

13. A lens barrel as recited in claim 12, further comprising:

a main optical system having an optical axis; and a focusing system positioned in front of the image blur prevention optical system to focus the main optical system, wherein the power transfer shaft drives the focusing system.

14. A lens barrel as recited in claim 13, wherein the power transfer shaft is parallel to the optical axis.

* * * * *